United States Patent [19]

Lang et al.

[11] Patent Number: 4,651,875
[45] Date of Patent: Mar. 24, 1987

[54] DESTRUCTIBLE CONTAINER FOR A MULTI-COMPONENT SETTABLE MASS

[75] Inventors: Gusztav Lang, Munich; Peter Mauthe, Kleinberghofen, both of Fed. Rep. of Germany

[73] Assignee: Hilti Aktiengesellschaft, Liechtenstein

[21] Appl. No.: 728,606

[22] Filed: Apr. 29, 1985

[30] Foreign Application Priority Data

Apr. 30, 1984 [DE] Fed. Rep. of Germany ....... 3416094

[51] Int. Cl.$^4$ .............................................. B65D 81/32
[52] U.S. Cl. .................................... 206/219; 206/568; 405/261
[58] Field of Search ............... 206/219, 568, 813, 216; 405/261

[56] References Cited

U.S. PATENT DOCUMENTS

| | | | |
|---|---|---|---|
| 2,982,396 | 5/1961 | Shihadeh | 206/219 |
| 3,108,443 | 10/1963 | Schuerma | 405/261 |
| 3,731,791 | 5/1983 | Fourcade et al. | 206/219 |
| 3,861,522 | 1/1975 | Llewellyn et al. | 206/219 |
| 3,921,800 | 11/1975 | Burns | 405/261 |
| 4,341,301 | 7/1982 | Meyer et al. | 206/219 |

FOREIGN PATENT DOCUMENTS 2065473 2/1975 Fed. Rep. of Germany.

Primary Examiner—William Price
Assistant Examiner—Jimmy G. Foster
Attorney, Agent, or Firm—Toren, McGeady and Goldberg

[57] ABSTRACT

A destructible container is arranged to maintain the components of a multi-component settable mass in separate regions until they are ready to be mixed for anchoring a fastener member in a borehole. The container is made up of an elongated outer cartridge and an inner cartridge positioned within the outer cartridge so that a space for one of the components is formed between the inner cartridge and the outer cartridge. The multi-component mass includes a resin component filled into the outer cartridge and a hardenable component filled into the inner cartridge. The space within the outer cartridge is divided into two separate regions, preferably one following the other in the elongated direction of the outer cartridge. The resin component is present in each region, however, a thixotropic agent is included in one region but not the other so that the viscosity of the resin component is greatly increased within the one region. Preferably, the increased viscosity is present in the region of the outer cartridge forming the trailing end of the container when it is inserted into a borehole so that flow out of the borehole is, for practical purposes, prevented. Accordingly, a resin component which is highly fluid prior to the mixing operation, such as methylmethacrylate (MMA) can be used.

8 Claims, 4 Drawing Figures

DESTRUCTIBLE CONTAINER FOR A MULTI-COMPONENT SETTABLE MASS

BACKGROUND OF THE INVENTION

The invention is directed to a destructible container for a settable multi-component mass used for anchoring a fastening member in a borehole. The container is formed of an outer cartridge and an inner cartridge positioned within the outer cartridge with one of the cartridges filled with a resin component and filler materials of the mass and the other cartridge with a hardenable component and possibly with additional filler materials.

The chemical anchoring of fastening members using a settable mass or material has definite advantages as compared to a mechanical anchoring, such as where a dowel is secured by an expansion procedure in a receiving material. These advantages include the lack of an expansion pressrre developed in the receiving material and anchoring the fastening member where only minor edge distances in the receiving material are involved.

In previously known chemical anchoring procedures relatively highly viscous materials, such as a polyester resin, an epoxy resin or a polyurethane resin have been used as the settable material enclosed within a container. Where there has been insufficient cleaning of the borehole prior to the insertion of the settable material or where the receiving material is porous or has fine microfissures hardly discernable by the naked eye, the adhesion of such highly viscous resins with the receiving material is limited. Apart from the reduction in anchoring values, which can be determined immediately, unfavorable long time behavior can occur particularly where the fastening member undergoes alternating stresses. To overcome such disadvantages, the use of low viscosity, that is highly fluid resins, has been attempted, however, when used in boreholes directed vertically upwardly or horizontally, such material tends to leak or run out of the borehole prior to becoming set. To avoid the loss of the material it has been known to utilize a multichamber container and to fill it at the opening into the borehole with components of a particularly rapidly settable, foamable resin mixture. Such foamable masses, however, have a considerably lower strength so that it is necessary to use longer fastening members and the boreholes must be correspondingly deeper, which results in increased assembly time and material costs. Further, water is required for the foaming process and it is not always available in the different receiving materials in which the fastening member is to be secured.

Other options for sealing the opening to the borehole, such as plugs or the like, have proved to be unsuitable in actual practice, because they become damaged or destroyed when the fastening member is driven in which is usually effected by a rotational action.

SUMMARY OF THE INVENTION

Therefore, the primary object of the present invention is to arrange a settable multi-component mass or material in a container for use in anchoring fastening members so that high anchoring values are attained and a simple and low cost installation is afforded.

In accordance with the present invention, the container is divided into regions one holding a low viscosity resin component and another with the resin component including thixotropic agents for increasing the viscosity of the component. Preferably, the low viscosity resin component is located in the leading region of the container as it is inserted into a borehole with the increased viscosity component being located at the trailing end of the container.

As a result, the resin component in the container is separated into two different regions with the component in each region having a different viscosity. After the insertion of the container into a borehole, the portion of the resin component located in the inner part of the borehole is more highly fluid than the portion of the component located at the opening into the borehole. The portion of the resin component enriched with known thixotropic agents, such as pyrogenous silicic acids, kaolin, asbestos, montmorrilonite or the like, forms a thick or heavy paste which can adapt to the borehole wall and to the fastening member to be anchored for preventing any flow out of the borehole of the highly fluid portion of the resin component. Therefore, a low viscosity resin, such as methylmethacrylate (MMA) can be used as the resin component. Such a highly fluid resin component is capable of forming an adequate bond to any dust remaining on the borehole wall and can provide an effective connection with the receiving material. If the receiving material has hairline cracks in the region of the borehole, then such cracks can be filled by the highly fluid resin component and the strength of the receiving material is improved.

For the simple fabrication of the container, in a preferred embodiment the container is made up of an outer cartridge and an inner cartridge. The inner cartridge holds the hardenable component while the space within the outer cartridge around the inner cartridge holds the resin component. The trailing portion of the outer cartridge as it is inserted into the borehole contains the thixotropic agents along with the resin component. Such an arrangement is favorable because the resin component involves a volume which is much greater than that of the hardenable component. Both the outer cartridge and the inner cartridge are formed of easily destructible plastics or glass. When broken up or fragmented, the material forming the cartridges affords additional filler materials.

To prevent any flow of the highly fluid portion of the resin component out of the borehole, the layer thickness of the viscous portion containing the thixotropic agents must be sufficiently great. On the other hand, the thickness of the viscous portion cannot be too great, since the viscous portion does not adhere to the borehole wall as well as the highly fluid portion of the resin component so that there would be a resultant reduction in the strength of the anchor formed. For a favorable relationship between the two portions, it is advantageous for the length of the trailing portion of the resin component containing the thixotropic agents to be in the range of 0.2 to 0.4 of the length of the leading end portion of the resin component. Such a length ratio affords optimum conditions for anchoring a fastening member. The portions of the resin component having different viscosities can be achieved using the same or different resins. Accordingly, the leading end portion filling the base of the borehole may consist of methylmethacrylate while the resin portion at the entrance into the borehole can be a polyester or epoxide resin.

At the transition between the leading end portion and the trailing end portion of the resin component, it is possible for the two portions to mix. To prevent such mixing a separation layer can be provided between the leading end portion and the trailing end portion. Such a separation layer must be easily destructible while the fastening member is being inserted. Accordingly, the separation layer may be formed of a foil, glass, or a partially set resin layer. Furthermore, it is also possible to use a layer of wax or the like between the two different regions. If the container is not completely filled by the sealed glass cartridges, any remaining open space within the container can be separated from the components forming the mass using a separation layer by filling the open space with a fibrous material. For the proper use of the container embodying the present invention it is important that it is inserted into the borehole in the proper manner, that is, that the leading end of the container is inserted first into the borehole. If the trailing end of the container is inserted first into the borehole, the viscous portion of the resin component is located at the base of the borehole and there is nothing to prevent the highly fluid portion from running out of the borehole. To facilitate the proper insertion of the container, it is possible to provide it with markings. To ensure the proper introduction of the container into the borehole, it is advantageous to provide a cover on the trailing end of the container, that is, the trailing end of the outer cartridge. The outside dimensions of the cover are preferably greater than the diameter of the borehole in which the container is to be inserted. The cover can be placed on a sealed container or it can be connected to the container by interengaging locking members or by a threaded connection or it can form the seal for the trailing end of the container. To avoid any interference with the placement of the fastening element into the container, the cover must be formed of an easily destructible material, for instance, a plastics material or the like.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive material in which there are illustrated and described preferred embodiments of the invention.

DETAILED DESCRIPTION OF THE INVENTION

Figure 1:
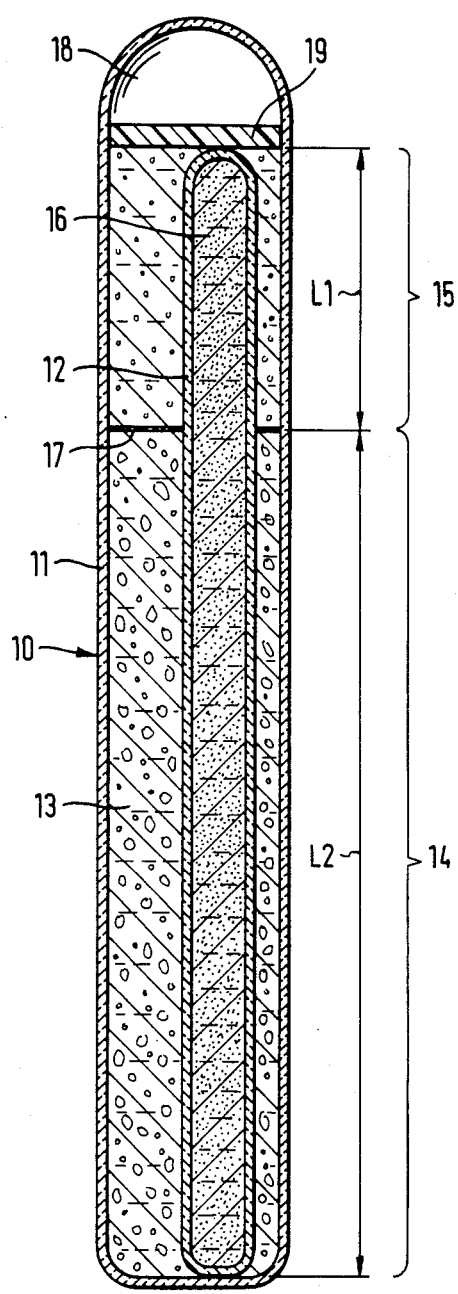
FIG. 1 is a cross-sectional view of a container embodying the present invention taken in the long direction of the container.

A destructible container 10 is shown in FIG. 1 and is made up of an elongated outer cartridge 11 and an elongated inner cartridge 12 located within the outer cartridge with the inner cartridge spaced inwardly from the outer cartridge so that a space or volume is provided in the outer cartridge around the inner cartridge. The container is inserted into a borehole having a similar diameter for securing a fastening member driven into the container when it is positioned within the borehole. The driving in action breaks up the material forming the inner and outer cartridges. The outer cartridge contains a resin component 13 and the volume within the outer cartridge around the inner cartridge is divided into a leading end region 14 and a trailing end region 15. The portion of the resin component 13 located within the trailing end region 15 is enriched with a thixotropic agent and, as a result, has a very high viscosity. The portion of the resin component located in the leading end region 14 of the outer cartridge 11 has a low viscosity and is formed of methylmethacrylate (MMA). The highly fluid portion of the resin component 13 in the leading end region 14 contains a relatively high amount of filler material, such as hollow glass spheres, quartz powder, glass tubelets or the like. The outer cartridge 11 and the inner cartridge 12 are formed of an easily destructible material, that is, a material that breaks or fractures easily, such as glass or a brittle plastics material. The hardenable component 16 located within the inner cartridge 12 consists, for instance, of dibenzoyl peroxide, polymethylmethacrylate-particles and filler material, such as quartz powder. Prior to inserting the fastening element into the container, the mixing of the resin component 13 in the leading end region 14 with the component in the trailing end region 15 is prevented during storing and handling of the container 10, by using a separation layer 17 which extends transversely of the long direction of the container and separates the two regions 14, 15. The separation layer may be formed of foil, glass or the like. When an outer cartridge 11 formed of glass is being sealed by melting the glass, it is practically unavoidable to form an air space 18 in the trailing end of the outer cartridge 11. To prevent air within the space 18 from causing a chemical change in the resin component 13 in the trailing end region 15, and also to prevent any displacement of the components within the outer cartridge, an end cover 19 is inserted into the outer cartridge 11 before the sealing operation so that the cover separates the resin component from any air in space 18. Further, the cover 19 bears against the trailing end of the inner cartridge 12 preventing it from becoming displaced. The length L1 of the trailing end region 15 containing the resin component 13 is approximately one-third of the length L2 of the leading end region 14, note FIG. 1.

The following is an example of the size and make-up of a container embodying the present invention for use with M12 anchor rods:

| | |
|---|---|
| Length of the outer cartridge: | 110 mm |
| Diameter of the outer cartridge: | 11.7 mm |
| Length of the inner cartridge: | 90 mm |
| Diameter of the inner cartridge: | 6.3 mm |
| Length L2 of the leading end region: | 65 mm |
| Content of the leading end region: | 7.1 g Quartz (granule size 1.2 to 1.8 mm) |
| | 2.5 g Methylmethacrylate (MMA) |
| Length L1 of the trailing end region: | 25 mm |
| Content of the trailing end region: | 1.15 g Methylmethacrylate (MMA) |
| | 2.4 g Quartz powder (particle size 10 to 60 μm) |
| | 0.08 g pyrogenous silicic acid |

-continued

The inner cartridge contains:
0.6 g dibenzoyl peroxide
0.2 g polymethylmethacrylate (PMMAA: particle size 0.1 mm)
1.7 g quartz powder (particle size 10–60 μm)

Figure 2:
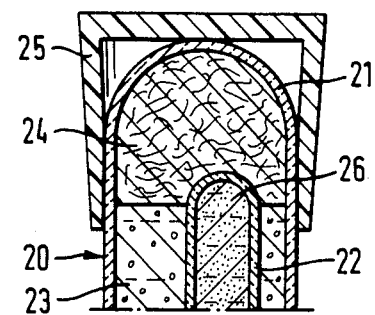
FIG. 2 is a partial view of another container embodying the present invention with a cover at the container end.

In FIG. 2 the trailing end of a container 20 is shown formed of an outer cartridge 21 and an inner cartridge 22. The outer cartridge 21 contains the resin component 23. The space between the trailing end of the resin component 23 and the trailing end of the outer cartridge 21 is filled with a fibrous material 24. The fibrous material prevents any displacement of the inner cartridge 22 or of the resin component 23 in the space within the outer cartridge about the inner cartridge. For identification purposes and also to prevent the inverted insertion of the container 20 into a borehole, a cover 25 is secured over the trailing end of the outer cartridge 21. The cover 25 is formed of an easily broken plastics material and has an outside diameter preferably larger than the diameter of the borehole in the receiving material intended to receive the container 20. A hardenable component 26 is filled into the inner cartridge 22.

Figure 3:
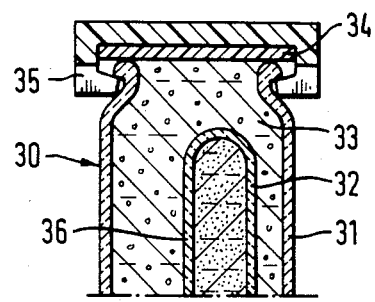
FIG. 3 is a further embodiment of the container, similar to FIG. 2, with a locking member engaging the end of the container.

In FIG. 3 container 30 is made up of an outer cartridge 31 and an inner cartridge 32. Outer cartridge 31 in the space around the inner cartridge, contains a resin component 33. As distinguished from the embodiments illustrated in FIGS. 1 and 2, outer cartridge 31 is not sealed in a melting operation, rather it is closed by a sealing disc 34 and a cover 35 in locking engagement with the trailing end of the outer cartridge 31. Due to this arrangement, the outer cartridge 31 can be filled with the resin component 33 and the inner cartridge 32 so that practically no air is present within the outer cartridge. The hardenable component 36 is filled into the inner cartridge 32.

Figure 4:
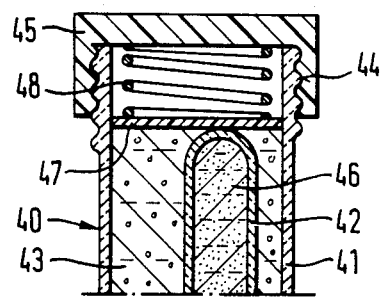
FIG. 4 is yet another embodiment of the invention with the cover threaded onto the end of the container.

In FIG. 4 another container 40 is displayed made up of an outer cartridge 41 and an inner cartridge 42. The resin component 43 is filled into the outer cartridge. The trailing end of the outer cartridge 41 has a thread 44 on which a cover 45 is screwed closing the open trailing end of the outer cartridge. A hardenable component 46 is contained within the inner cartridge 42. The inner cartridge 42 and the resin component 43 within the outer cartridge and around the inner cartridge are maintained in the position shown by a membrane 47 contacting the trailing end of the inner cartridge 42 and the trailing end of the resin component 43. The membrane 47 is spaced inwardly from the open trailing end of the outer cartridge 41 and a spring element 48 extends between the membrane 47 and the cover 45. The cover 45 along with the membrane 47 and the spring element 48 are formed of materials which are easily broken or destroyed. If required, however, the cover 45 and the spring element 48 can be removed before the container 40 is inserted into a borehole.

While specific embodiments of the invention have been shown and described in detail to illustrate the application of the inventive principles, it will be understood that the invention may be embodied otherwise without departing from such principles.

We claim:

1. Destructible container including a mixable settable multi-component material for anchoring a fastening member in a borehole wherein the components are maintained separate until ready to anchor the fastening member and upon mixing of the components they harden or set to afford the anchoring effect, said container consisting of a destructible outer cartridge, and a destructible inner cartridge located completely within said outer cartridge so that a volume is present within said outer cartridge laterally exterior of said inner cartridge, said multi-component material comprising a resin component filled into one of said outer cartridge and inner cartridge and a hardenable component filled into the other one of said outer cartridge and inner cartridge and being maintained separated from said resin component prior to the destruction of said inner and outer cartridges, wherein the improvement comprises that the one of said outer cartridge and inner cartridge containing said resin component has a first region and a second region, said first and second regions each containing said resin component, means separating said first and second regions prior to the destruction of said inner and outer cartridges, and a thixotropic agent in only one of said first and second regions for increasing the viscosity of said resin component therein so that upon destruction of said cartridges and displacement of said means separating said first and second regions, said resin component and said hardenable component intermix within the borehole into which said container is inserted for effecting the setting of the multi-component material, the increased viscosity of the thixotropic agent inhibits flow of the material out of the borehole, a filler material is included in said resin component, said outer cartridge is elongated in the insertion direction in which said container is inserted into the borehole and has an identifiable leading end forming the first end inserted into the borehole and an opposite trailing end, said inner cartridge is elongated in the insertion direction of said container and has a leading end and a trailing end, and the one of said outer cartridge and inner cartridge filled with the resin component is divided by said separating means extending transversely of the insertion direction and intermediate the leading end and the trailing end into a leading end region extending from the leading end and a trailing end region extending from the trailing end, and said leading end region forms said first region and said trailing end region forms said second region and said thixotropic agent being located in said trailing end region, said resin component and filler material is located within the volume in said outer cartridge enclosing said inner cartridge, and said hardenable component is located within said inner cartridge.

2. Destructible container, as set forth in claim 1, wherein a filler material is included within said hardenable component.

3. Destructible container including a mixable settable multi-component material for anchoring a fastening member in a borehole wherein the components are maintained separate until ready to anchor the fastening member and upon mixing of the components they harden or set to afford the anchoring effect, said container comprising a destructible outer cartridge, and a destructible inner cartridge located completely within said outer cartridge so that a volume is present within said outer cartridge exterior of said inner cartridge, said multi-component material comprising a resin component filled into one of said outer cartridge and inner cartridge and a hardenable component filled into the other one of said outer cartridge and inner cartridge and being separated from said resin component prior to the destruction of said inner and outer cartridges, wherein the improvement comprises that the one of said outer cartridge and inner cartridge containing said resin component has a first region and a second region, said first and second regions each containing said resin component, means separating said first and second regions, and a thixotropic agent in only one of said first and second regions for increasing the viscosity of said resin component therein so that upon destruction of said cartridges and displacement of said means separating said first and second regions said resin component and said hardenable component intermix within the borehole into which said container is inserted for effecting the setting of the multi-component material, a filler material is included in said resin component, said outer cartridge is elongated in the insertion direction in which said container is inserted into the borehole and has an identifiable leading end forming the first end inserted into the borehole and an opposite trailing end, said inner cartridge is elongated in the insertion direction of said container and has a leading end and a trailing end, and the one of said outer cartridge and inner cartridge filled with the resin component is divided intermediate the leading end and the trailing end into a leading end region extending from the leading end and a trailing end region extending from the trailing end, and said leading end region forms said first region and said trailing end region forms said second region and said thixotropic agent being located only in said trailing end region, said resin component and filler material is located within the volume in said outer cartridge enclosing said inner cartridge, and said hardenable component is located within said inner cartridge, the length in the elongated direction of said trailing end region containing the thixotropic agent is in the range of 0.2 to 0.4 times the length in the elongated direction of the leading end region containing the resin component.

4. Destructible container, as set forth in claim 3, wherein a separation layer extending transversely of the elongated direction separates the leading end region and the trailing end region so that the resin components therein do not intermix.

5. Destructible container, as set forth in claim 3, including a cover secured to the trailing end of said outer cartridge and said cover having a larger diameter than the largest diameter of said outer cartridge.

6. Destructible container, as set forth in claim 3, wherein the trailing end of the resin component containing the thixotropic agent within the trailing end region within said outer container is spaced from the trailing end of said outer cartridge, a separation layer within said outer cartridge extending transversely of the elongated direction and in contact with the trailing end of the resin component within said trailing end region and with the trailing end of said inner cartridge so that an air space is formed between said separation layer and the inside surface of the trailing end of said outer cartridge.

7. Destructible container, as set forth in claim 3, wherein said outer cartridge and inner cartridge are formed of an easily breakable material.

8. Destructible container, as set forth in claim 7, wherein said outer cartridge and inner cartridge are formed of one of glass and a brittle plastics material.

* * * * *